(No Model.)
E. D. SIBBREL & F. LONGABACH.
VEGETABLE SLICER.
No. 513,833.    Patented Jan. 30, 1894.
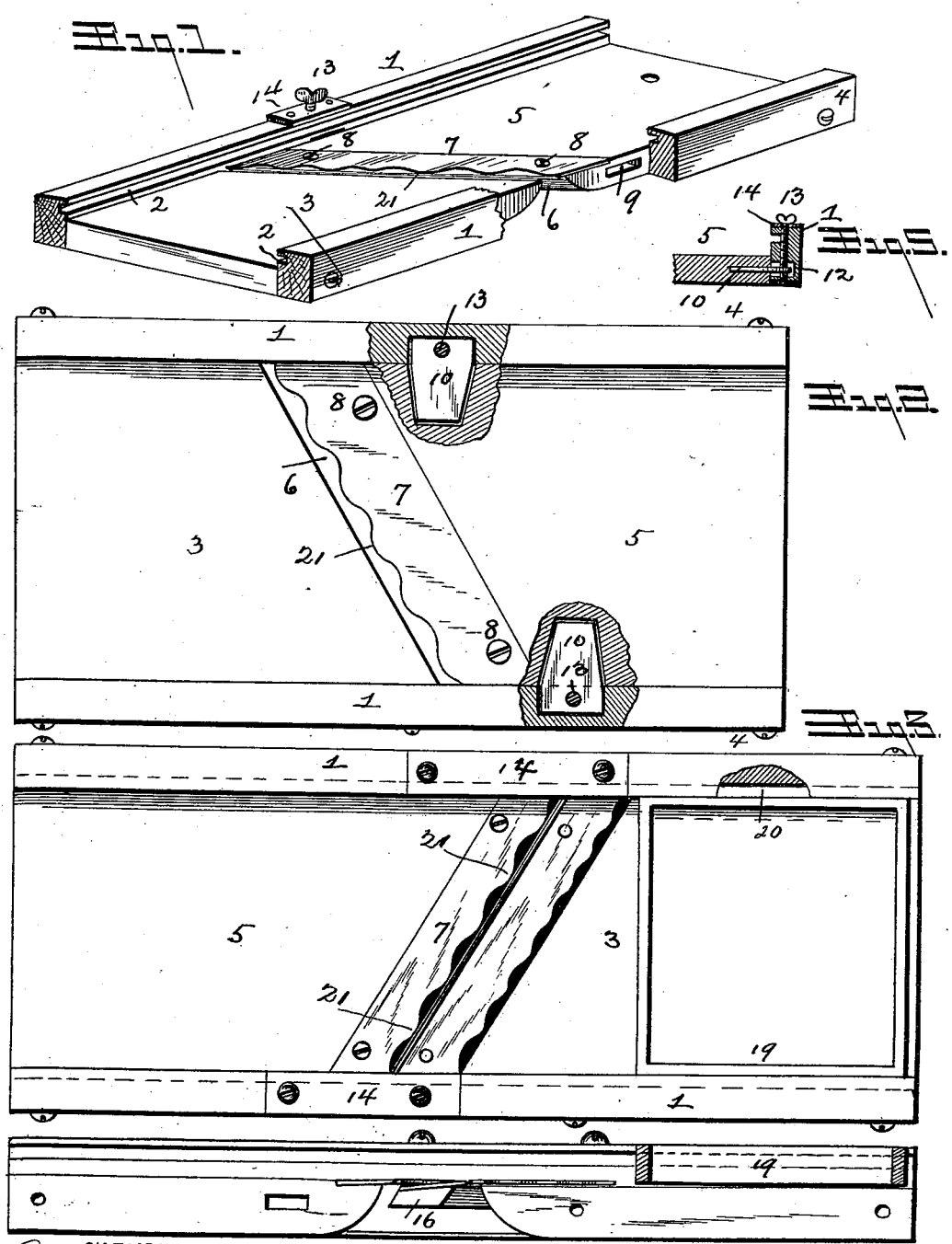
WITNESSES
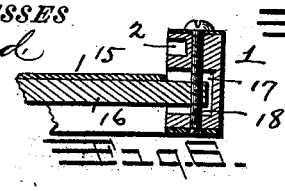
INVENTORS:
Eli D. Sibbrel and
Frederick Longabach,

UNITED STATES PATENT OFFICE.

ELI D. SIBBREL AND FREDERICK LONGABACH, OF FREMONT, OHIO.

VEGETABLE-SLICER.

SPECIFICATION forming part of Letters Patent No. 513,833, dated January 30, 1894.

Application filed May 8, 1893. Serial No. 473,472. (No model.)

*To all whom it may concern:*

Be it known that we, ELI D. SIBBREL and FREDERICK LONGABACH, both residents of Fremont, in the county of Sandusky and State of Ohio, have invented certain new and useful Improvements in Vegetable-Slicers; and we do hereby declare that the following is a full, clear, and exact description of the invention, which will enable others skilled in the art to which it appertains to make and use the same, reference being had to the accompanying drawings, which form a part of this specification.

Our invention relates to improvements in vegetable slicers being more especially adapted for cutting cabbage for slaw or sauerkraut.

The object of the invention is to provide an improved construction of cutting knife and also to provide means for adjusting the pivoted board to which the knife or blade is secured with respect to the stationary board whereby the size or depth of the cut made is regulated.

The invention consists in the novel construction and combination of parts hereinafter fully described and claimed.

In the accompanying drawings: Figure 1 is a perspective view of a vegetable slicer or cutter constructed in accordance with our invention, one side of which is partly broken away. Fig. 2 is a plan view of the same with parts broken away. Fig. 3 is a plan view of a modified construction. Fig. 4 is a side elevation of the same, one of the side bars or pieces being removed. Figs. 5 and 6 are detail views.

In the said drawings, the reference numeral 1 designates two side bars or beams, having grooves 2 in their inner sides, extending from end to end thereof. To these side bars is secured by screws or otherwise the stationary bottom board 3, and also pivoted thereto at 4 is the adjustable bottom board 5, which carries the knife or knives. The adjoining ends of these boards are cut away on a diagonal line as shown, forming a diagonal space 6, and the under sides of said ends are beveled as seen in Fig. 1.

The pivoted board 5 is formed on the upper side of its inner end with a recess in which is seated the diagonal cutting blade or knife 7, secured thereto by means of screws 8. Formed in the sides of said pivoted board are recesses 9 into which are inserted lugs 10, which are capable of working up and down in slots 12 in the side boards 1. These lugs are provided with apertures in which work set screws 13, which also pass through said side pieces and through plates 14 secured thereto. The object of these set screws and lugs is to adjust the pivoted board with respect to the stationary board so as to regulate the thickness of cut of the said knife.

In the modification shown in Figs. 3, 4 and 6 which is designed more especially for cutting cabbage, there are two knives or blades employed, one in front of the other, the rear knife in this instance being identical with knife 7, and the bottom board to which it is secured being the same in construction and operation as that above described. The front knife 15, however, is secured to a diagonal bar or plate 16, the ends of which engage in slots 17 in the side bars and the ends of said bar or plate are provided with apertures through which pass regulating screws 18.

The numeral 19 designates a rectangular carriage consisting of four boards connected together at their ends. The side bars of this carriage are provided with ribs 20, Fig. 3, which work in the grooves in the inner faces of the side bars 1. The carriage is intended to receive the objects to be cut and forms a guard to prevent injury to the hand while the said objects are being fed to the knives or blades. The knife or blade it will be observed, is formed with a series of curved teeth 21, thus enabling them to be adjusted closer to the stationary board, whereby they are rendered more efficient in performing their work.

The operation is as follows: The pivoted board is adjusted by means of the set-screws, so as to bring the blade more or less in line with the stationary board, according to the extent of the cut to be made. The object to be sliced is now placed within the rectangular carriage and the latter reciprocated back and forth, when the said object will be sliced, the thickness of the slice depending upon the adjustment of said pivoted board. When the double knives are used, as shown in Figs. 3 and 4, the front knife can be adjusted independently of the rear knife secured to the pivoted board, as it is not connected in any way with said board.

While as before stated the device is intended more particularly for slicing cabbage for making sauer kraut or slaw, yet it is obvious that it may be employed for slicing other articles of food of a similar nature.

Having thus described our invention, what we claim is—

1. In a vegetable slicer, the combination with the side bars having slots therein, the stationary boards secured to said sides, the pivoted board formed with a slot in each side, and the diagonal cutting blade or knife secured to said pivoted board, of the lugs working in the slots in said side bars and engaging with the slots in the pivoted board, and the set screws passing through correspondingly threaded apertures in said lugs and through plates secured to the side boards whereby the said pivoted board may be adjusted relatively to the stationary board, substantially as described.

2. In a vegetable slicer, the combination with the side bars having grooves in their inner sides and formed with slots, the stationary and pivoted bottom boards having their inner or adjoining ends cut away on diagonal lines, of the rear lugs inserted in recesses in said pivoted board and having their outer ends working in slots in the side bars and formed with screw-threaded apertures, the set-screws engaging with said lugs, the rear knife connected with said pivoted board, the front knife secured to a diagonal bar, the ends of which are formed with screw-threaded apertures and working in slots in said side bars, and the set-screws engaging with said bar whereby the knife may be adjusted, substantially as described.

In testimony that we claim the foregoing as our own we have hereunto affixed our signatures in presence of two witnesses.

ELI D. SIBBREL.
FREDERICK LONGABACH.

Witnesses:
JAMES A. HOUCK,
F. E. SEAGER.